Aug. 2, 1966     T. W. D. MURPHY     3,264,534
ELECTRICAL COMPONENT AND TERMINAL CONSTRUCTION
Filed April 21, 1964     2 Sheets-Sheet 2
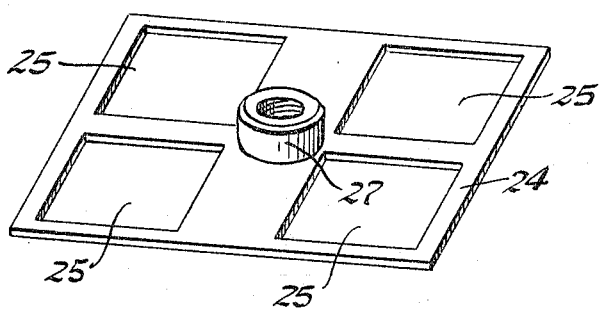
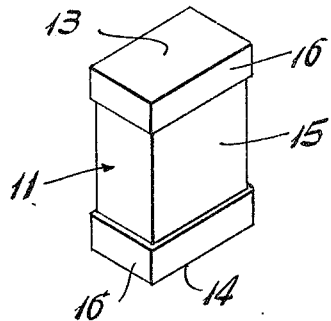
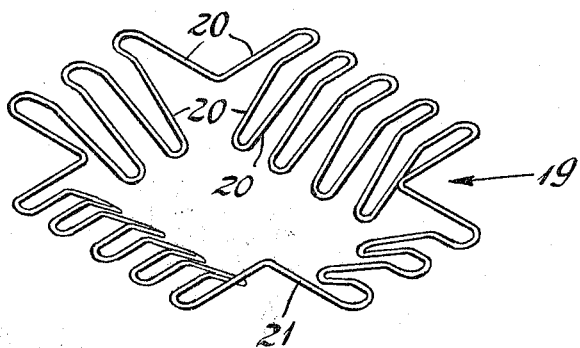
INVENTOR.
Terence W. D. Murphy
BY
Johnson and Kline
ATTORNEYS

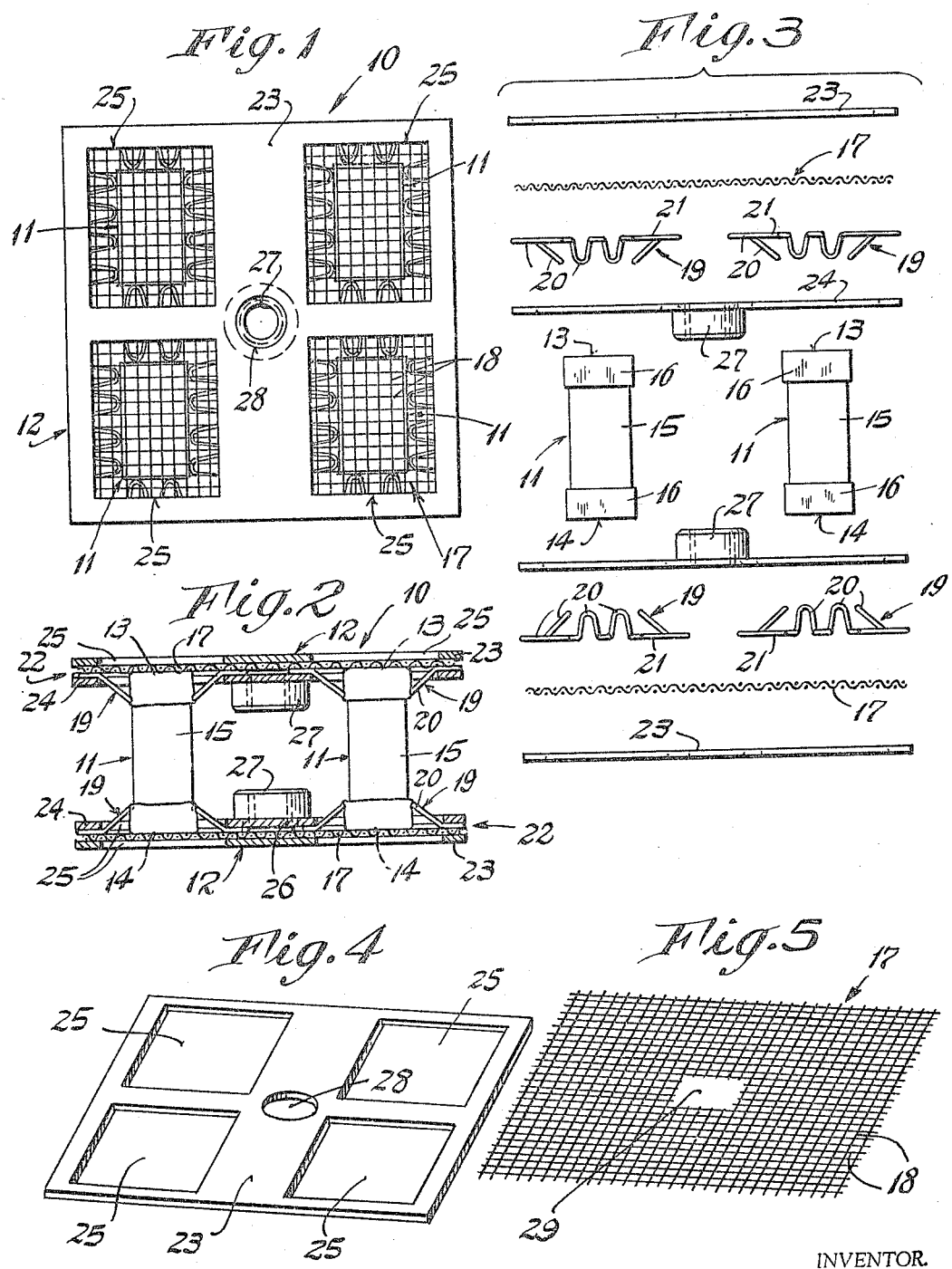

United States Patent Office 3,264,534
Patented August 2, 1966

3,264,534
ELECTRICAL COMPONENT AND THERMAL
CONSTRUCTION
Terence W. D. Murphy, West Harrow, Middlesex, England, assignor to Vitramon, Incorporated, Monroe, Conn., a corporation of Delaware
Filed Apr. 21, 1964, Ser. No. 361,441
3 Claims. (Cl. 317—243)

This invention relates to terminal means for electrical components. More specifically, it pertains to terminal means for heat generating components, such as high current capacitors, having a unitary, frangible, heat-expandible body.

While the present invention is applicable to any heat generating electrical component, wherein the difference in coefficient of expansion between the body of the component and the terminal means is great, it has particular applicability to high current capacitors, such as disclosed in Lee et al. Patent No. 2,779,975, which includes a monolythic frangible body of porcelain or similar brittle material.

In electrical components, such as the high current porcelain capacitor, it has been found that, while the dense component body can itself relatively rapidly dissipate generated heat, to take advantage of this property, terminal means must be provided which, in addition to having a low resistance to the flow of electrical current, have high thermal conductivity.

Heretofore, terminal means combining the characteristics of low resistance to the flow of current and high thermal conductivity comprised solid metallic conductors of relatively great cross-section, such conductors being connected to the body of the component by a rigid bond of the soldered, welded or similar unyielding type.

While the prior known terminal means have recognized utility with components having relatively malleable bodies or a thermal coefficient of expansion similar to that of the terminal, it has been found that where the body of the component is brittle and frangible and the thermal coefficient of expansion between such body and the terminal means differs greatly, as is the case with porcelain bodies and solid metallic conductors, there is a tendency for the body to rupture or crack as a result of the stresses set up by the differing thermal expansion. The fissures or cracks, which tend to eventually cause the electrical component to become defective, present a particularly aggravated problem when the component is a high current capacitor, since such components are subject to the application of high voltage on the dielectric so that even minor fissures produce catastrophic failures.

The present invention overcomes the problems aforenoted and has as an important object thereof to provide an improved terminal means for heat generating electrical components, of the type including a unitary, frangible, heat-expandible body, which has a low resistance to the flow of electrical current, a high thermal conductivity and the ability to absorb and dissipate pressure resulting from differing thermal coefficients of expansion.

According to the invention, the foregoing object is achieved by providing a terminal means which includes a plurality of highly flexible, readily distortable electrically conductive elements adapted to absorb and dissipate, through the distortion of the elements, pressures transmitted thereto by the expansion of the body. Specifically, it is contemplated that the terminal means comprise a woven web or screen of independent electrically conductive elements adapted to have surface contact with the body of the component, the elements collectively having a cross-section providing high thermal conductivity and independently flexing or distorting in response to pressure transmitted thereto by the expansion of the body for dissipating such pressure.

According to the invention, the woven terminal web, which is preferably planar and of such a size that the elements thereof collectively provide the desired current conducting path, has the advantage of lying flat against the body so that it projects radially outwardly of the body, rather than axially of it, thereby reducing the space required for the component.

It is therefore, also an object of the invention to provide a terminal means for a heat generating electrical unit which, in addition to dissipating pressures created by the differing thermal expansion of the component and terminal means, has the advantage of radial extension from the component body, thereby reducing the space, in an axial direction relative to the body, required for the unit.

It is also an object of the invention to provide a high current terminal means, having high thermal conductivity, which includes a plurality of readily distortable electrically conductive elements adapted to flex or distort in response to pressures transmitted thereto by the expansion of the heat expandable body to which the terminal means is connected for dissipating such pressures, whereby the body is protected against fracture or strain.

Another object of the invention is to provide a terminal means, having low resistance to the flow of electrical current and a cumulative cross-section providing high thermal conductivity, which includes a plurality of readily distortable elements woven to form a web or screen adapted to have surface and electrical contact with the body of the component to which the terminal means is connected.

Another object of the invention is to provide a terminal means for connecting a heat generating electrical component, having a parallelepiped body, into a circuit, which includes a first member, comprising a plurality of independent, readily distortable elements woven to form a planar web, adapted to have surface contact with one surface of the body and a second member, in contact with the first member, comprising a plurality of independently distortable elements, adapted to have surface contact with at least one surface of the body adjacent the surface contacted by said first member.

Still another object of the invention is to provide a terminal means for connecting an assembly of heat generating, heat-expandible electrical components into a circuit, which, in addition to dissipating expansion pressures transmitted to the terminal means by the components, also mounts and connects the components in a predetermined physical and electrical relationship.

It is further an object of the invention to provide a high current capacitor having terminal means embodying the concepts of the invention.

It is still further an object of the invention to provide a high current, heat dissipating, pressure absorbing terminal means for connection to heat generating electrical components having unitary heat-expandible, frangible bodies, which is adapted to be preformed and is readily assembled with the component body.

Other objects and advantages of the invention will be apparent from the specification and claims, when considered in connection with the attached sheets of drawings, illustrating one form of the invention, wherein like characters represent like parts and in which:

FIGURE 1 is a plan view of a capacitor assembly embodying the invention;

FIG. 2 is a side elevational, sectional view of the assembly of FIG. 1;

FIG. 3 is an exploded side view of the assembly of FIG. 1; and

FIGS. 4 to 8 are perspective views of the elements of the assembly of FIG. 1.

Referring now to the drawings, the invention is shown embodied in a component assembly 10, including a plurality of heat generating electrical units 11 and terminal means 12 connected thereto.

While the concepts of the invention, as embodied in the terminal means 12 are here illustrated in a component assembly including a plurality of heat generating units 11, it should be understood that they are applicable equally as well to single unit components.

The components 11, here illustrated for purposes of explanation, are high current capacitors having their opposed electrodes (not shown) exposed outwardly of the opposite ends of the capacitor body, but it is within the scope of the invention that the concepts thereof apply to any heat generating electrical unit having a unitary, frangible, heat-expandible body requiring terminal means for connecting the unit into an electrical circuit.

The high current capacitors 11, which may be of the type disclosed in the United States patent to Lee et al., No. 2,779,975, comprises a monolithic, parallelepiped body of superposed, substantially parallel layers of dielectric and electrically conductive material, the latter layers being divided into two electrically distinct groups, forming the opposite electrodes of the capacitor, as is well known in the art. The electrodes, which are not shown since they have no direct bearing on the invention, are exposed at the surface, at opposite ends 13 and 14, of the unit body 15. Solder cap preforms 16 may be disposed over the ends 13 and 14 of the body 15, for a purpose to be more fully explained hereinafter.

The terminal means 12, which may be preformed for later assembly with electrical units 11, are here illustrated as each comprising an assembly of members, but it should be understood that, in the broadest concept of the invention, it is only required that the terminal means comprise a plurality of independent, readily flexible or distortable elements having a low resistance to the flow of current and a cumulative cross-section providing high thermal conductivity, the elements being capable of dissipating, physical pressures transmitted thereto, by distorting.

As illustrated, the terminal means 12 each include a woven web or screen 17 formed of a plurality of independent, electrically and thermally conductive wires or elements 18, having a collective cross-section providing high thermal conductivity. As will be understood, the individual elements 18, which are thin enough to be readily distorted by pressure applied to them, are independently flexible within the weave of the web 17, to the extent necessary to dissipate pressure transmitted to them by the expansion of the component body 15.

The web 17, which is preferably planar to facilitate surface contact with an end of the component body 15, whereby maximum removal of heat from the body is achieved, is electrically connected to the electrode exposed at such end of the body, in a manner to be later discussed.

While it is apparent that if the web 17 is self supporting it may comprise the entire terminal means 12, in the illustrated and preferred form of the invention additional means are provided for dissipating heat from the component body and maintaining the terminal means assembly in its desired shape.

It has been found desirable, in order to dissipate the maximum amount of heat from the component body 11 in the shortest amount of time, to provide a second group 19 of independently flexible, electrically and thermally conductive elements 20, which are in contact with the web 17 and have surface engagement with surfaces of the component body 15, adjacent the end surface contacted by the web. While the group 19 may comprise a web similar to the web 17, but preformed in any desired manner to make the necessary engagement with the surfaces of the body, in the illustrated and preferred form of the invention, in order to facilitate manufacture of the terminal means and assembly thereof with the component or components, the group 19 is formed of a single wire 21 shaped to form the elements 20 and provide a preform for receiving the component body in the desired manner. Where, as here illustrated, the terminal means is connected to more than one component 11, a preform 19 is provided in the terminal means for each component and is positioned in contact with web 17 in relation to the position of the components.

In order to rigidly support the terminal means 12 in the desired shape and retain the relationship between the web 17 and the preform or preforms 19, a clamping assembly 22 is provided including electrically conductive unitary members 23 and 24. While it will be apparent that in the construction of a terminal means for a single component the members 23 and 24 of the clamping assembly 22 need only comprise a unitary frame adapted to engage the periphery of the web 17 and preform 19 and be secured together therearound, in the multiple component assembly shown the members are formed to provide individual frames for each component unit 11. As illustrated, the members 23 and 24 may be formed from sheets of metal or the like to provide openings 25 corresponding in number and relative position to the number and position of components 11 to which the terminal means is connected. The openings 25, which are of a size to define an optimum flexible or distortable length for elements 18 of web 17, for each component in the assembly, are superposed, with the web and preforms clamped therebetween, and are secured by brazing, welding or similar means.

In the illustrated form of the invention, the member 24 of each terminal means is formed with a centrally disposed opening 26 and is provided with an internally threaded stud 27 for receiving a threaded pin or the like (not shown) for making connection into an electrical circuit. The member 23 and web 17 are similarly formed with openings 28 and 29, respectively, which are adapted to be aligned with the opening 26 in member 24 to facilitate insertion of the pin into the stud.

After the terminal means 12 are assembled, which may be accomplished prior to their connection to the components 11, they are connected to the components by any known means such as soldering, welding or the like. Preferably, however, the components are provided with the solder cap preforms 16, discussed above, and the connection is made by melting the preforms and forming the bond in a soldering oven.

By means of the construction, above described, a terminal means is provided for one or a plurality of heat generating electrical components, each having a unitary, frangible heat-expandible body, which in addition to carrying electrical current and providing a heat sink for the components, dissipates pressures transmitted thereto by the expansion of the component body so that the body is protected against fracture or strain.

Thus, among others, the several objects and advantages of the invention as aforenoted are achieved. Obviously numerous changes in the structure may be resorted to without departing from the spirit of the invention as defined by the claims.

I claim:

1. A heat generating electrical component comprising a unitary frangible heat-expandible parallelepiped body having terminal means connected thereto for electrically connecting said component into an electrical circuit and dissipating the heat therefrom, said terminal means having low resistance to the flow of electrical current and including a woven planar web member formed of a plurality of electrically conductive independent elements extending transversely of said body and having surface contact with one surface thereof, a second member having contact with at least one of the surfaces of said body adjacent said first named surface, and means for connecting said members and retaining said woven member in said plane, said elements of said woven member and said second member cooperatively having a cross-section providing a high thermal conductivity and independently being readily distortable and absorbing through the distortion of said elements and second member pressure transmitted thereto by the expansion of said body, whereby said body is protected against fracture and strain.

2. A high current heat generating capacitor assembly comprising a plurality of spaced juxtaposed capacitor units adapted to be electrically connected in parallel, said units each including a unitary frangible heat-expandible body having at least a pair of exposed electrically opposed electrode terminations at opposite ends of the body; an electrically conductive terminal means connected to the corresponding electrode terminations of said capacitor units for electrically connecting such electrode terminations and electrically connecting said assembly into an electrical circuit, said terminal means dissipating the heat from said bodies and having low resistance to the flow of electrical current, said terminal means each including a plurality of independent elements woven to form a planar web having surface contact with the respective end surfaces of said bodies, a flexible member for each capacitor unit connected to said web and engaging at least one surface of its respective capacitor unit adjacent the said end surface thereof, and frame means for supporting said web in said plane so that said capacitor units are retained in position relative to one another, said elements of said web and said flexible members cooperatively having a cross-section providing high thermal conductivity and independently being readily distortable and absorbing through the distortion of said independent elements and said members pressure transmitted thereto by the expansion of said body, whereby said body is protected against fracture and strain; and means forming part of said frame means for engaging a lead for electrically connecting said assembly into a circuit.

3. A terminal for connection to a heat generating electrical component for electrically connecting such component into an electrical circuit and dissipating the heat therefrom, said component including a unitary frangible heat-expandible body, said terminal being adapted to be connected to said component body and having low resistance to the flow of electrical current and comprising a first member formed of a plurality of independently readily distortable elements, said elements being woven together to form a planar web adapted to extend transversely of said body and have surface contact therewith, a second member formed of a plurality of independently distortable elements substantially parallel to and in engagement with said web, said second member being shaped to engage surfaces of said body adjacent the surface contacted by said web, and rigid clamping means for retaining said first and second members in engagement and supporting said web to maintain its planer form, said elements of said members collectively having a cross-section providing high thermal conductivity and being adapted to absorb through the distortion of said elements pressure transmitted thereto by the expansion of said body, whereby said body is protected against fracture and strain.

References Cited by the Examiner
UNITED STATES PATENTS

| | | | |
|---|---|---|---|
| 2,279,445 | 4/1942 | Clancy | 338—332 |
| 2,539,332 | 1/1951 | Schneider | 317—260 |
| 2,879,041 | 3/1959 | Ross | 174—35 X |
| 2,883,446 | 4/1959 | Nye | 174—35 |
| 3,121,188 | 2/1964 | Foster | 317—100 |

LARAMIE E. ASKIN, *Primary Examiner.*

JOHN F. BURNS, ROBERT K. SCHAEFER,
*Examiners.*

E. GOLDBERG, *Assistant Examiner.*